US011133580B2

(12) United States Patent
Li et al.

(10) Patent No.: US 11,133,580 B2
(45) Date of Patent: Sep. 28, 2021

(54) ANTENNA DEVICE

(71) Applicant: InnoLux Corporation, Miao-Li County (TW)

(72) Inventors: I-Yin Li, Miao-Li County (TW); Yi-Hung Lin, Miao-Li County (TW); Chin-Lung Ting, Miao-Li County (TW); Tang-Chin Hung, Miao-Li County (TW); Jeng-Nan Lin, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 551 days.

(21) Appl. No.: 15/788,888

(22) Filed: Oct. 20, 2017

(65) Prior Publication Data
US 2018/0375200 A1 Dec. 27, 2018

Related U.S. Application Data

(60) Provisional application No. 62/551,267, filed on Aug. 29, 2017, provisional application No. 62/523,336, filed on Jun. 22, 2017.

(51) Int. Cl.
H01Q 1/00 (2006.01)
H01Q 1/36 (2006.01)
(Continued)

(52) U.S. Cl.
CPC ............... H01Q 1/36 (2013.01); H01Q 3/44 (2013.01); H01Q 9/0407 (2013.01);
(Continued)

(58) Field of Classification Search
CPC ........ H01Q 1/36; H01Q 21/0006; H01Q 3/44; H01Q 13/106; H01Q 9/0407; H01Q 1/50; H01Q 1/00; G02F 1/1339
See application file for complete search history.

(56) References Cited

U.S. PATENT DOCUMENTS 5,251,049 A * 10/1993 Sato ...................... G02F 1/1393
349/110
5,361,151 A * 11/1994 Sonehara .......... G02F 1/133528
349/117
(Continued)

FOREIGN PATENT DOCUMENTS

CN 1497299 A 5/2004
CN 101142516 A 3/2008
(Continued)

OTHER PUBLICATIONS

European Office Action dated Feb. 12, 2020, issued in application No. EP 18160284.8.
(Continued)

Primary Examiner — Dimary S Lopez Cruz
Assistant Examiner — Bamidele A Jegede
(74) Attorney, Agent, or Firm — McClure, Qualey & Rodack, LLP

(57) ABSTRACT

An antenna device is provided, which includes a first substrate, and a second substrate facing and spaced with the first substrate in a distance. At least one working element disposed between the first substrate and the second substrate, wherein the at least one working element is filled with a modulation material. At least one buffer element is connected with the at least one working element for adjusting the amount of the modulation material in the at least one working element.

13 Claims, 12 Drawing Sheets

(51) Int. Cl.
*H01Q 9/04* (2006.01)
*H01Q 13/10* (2006.01)
*H01Q 3/44* (2006.01)
*H01Q 21/00* (2006.01)
*G02F 1/1339* (2006.01)

(52) U.S. Cl.
CPC ....... *H01Q 13/106* (2013.01); *H01Q 21/0006* (2013.01); *G02F 1/1339* (2013.01)

(56) References Cited

U.S. PATENT DOCUMENTS

| | | | | | |
|---|---|---|---|---|---|
| 5,515,188 | A * | 5/1996 | Miles | G02F 1/1339 | 156/285 |
| 5,677,749 | A * | 10/1997 | Tsubota | G02F 1/1339 | 349/160 |
| 5,852,484 | A * | 12/1998 | Inoue | G02F 1/1334 | 349/86 |
| 6,008,871 | A * | 12/1999 | Okumura | G02F 1/13362 | 349/113 |
| 6,011,607 | A * | 1/2000 | Yamazaki | G02F 1/13454 | 349/151 |
| 6,088,115 | A * | 7/2000 | Ohsaki | G01N 21/21 | 356/445 |
| 6,215,549 | B1 * | 4/2001 | Suzuki | G01N 21/23 | 356/338 |
| 6,304,306 | B1 * | 10/2001 | Shiomi | C09K 19/544 | 349/88 |
| 6,680,761 | B1 * | 1/2004 | Greene | G02F 1/13336 | 349/153 |
| 7,023,518 | B1 * | 4/2006 | Koyama | G02F 1/136204 | 349/151 |
| 10,170,826 | B2 | 1/2019 | Nakazawa et al. | | |
| 2002/0080307 | A1 * | 6/2002 | Kuroiwa | G02F 1/1309 | 349/96 |
| 2002/0163614 | A1 * | 11/2002 | Hinata | G02F 1/1345 | 349/139 |
| 2004/0001177 | A1 * | 1/2004 | Byun | G02F 1/1341 | 349/187 |
| 2004/0125320 | A1 * | 7/2004 | Bouten | G02F 1/13394 | 349/156 |
| 2004/0183987 | A1 * | 9/2004 | Suzuki | G02F 1/1339 | 349/153 |
| 2004/0239444 | A1 * | 12/2004 | Sledkov | H01Q 1/246 | 333/128 |
| 2005/0140914 | A1 * | 6/2005 | Sawasaki | G02F 1/13394 | 349/155 |
| 2005/0206812 | A1 * | 9/2005 | Tsubata | G02F 1/13394 | 349/107 |
| 2005/0237459 | A1 * | 10/2005 | Ikeda | G02F 1/1337 | 349/123 |
| 2006/0033874 | A1 * | 2/2006 | Sakama | G02F 1/13 | 349/152 |
| 2006/0203178 | A1 | 9/2006 | Cho et al. | | |
| 2006/0215102 | A1 * | 9/2006 | Otose | G02F 1/13454 | 349/151 |
| 2006/0275989 | A1 * | 12/2006 | Ting | G02F 1/133351 | 438/283 |
| 2007/0211202 | A1 * | 9/2007 | Ishii | G02F 1/1339 | 349/153 |
| 2007/0284627 | A1 * | 12/2007 | Kimura | G02F 1/136286 | 257/257 |
| 2008/0252839 | A1 * | 10/2008 | Nakadaira | H01L 51/5253 | 349/153 |
| 2009/0002619 | A1 * | 1/2009 | Kanai | G02F 1/1341 | 349/129 |
| 2009/0002625 | A1 * | 1/2009 | Koo | G02F 1/133382 | 349/158 |
| 2009/0009697 | A1 * | 1/2009 | Tsuji | G02B 5/201 | 349/106 |
| 2009/0147208 | A1 * | 6/2009 | Tatemori | G02F 1/13394 | 349/156 |
| 2010/0014043 | A1 * | 1/2010 | Ootaguro | G02F 1/1339 | 349/154 |
| 2010/0033667 | A1 * | 2/2010 | Huang | G02F 1/133351 | 349/153 |
| 2010/0141135 | A1 * | 6/2010 | Kase | G02F 1/133351 | 313/512 |
| 2010/0258346 | A1 * | 10/2010 | Chen | H01L 51/525 | 174/521 |
| 2011/0013125 | A1 * | 1/2011 | Lee | G02F 1/133711 | 349/106 |
| 2011/0018008 | A1 * | 1/2011 | Lee | H01L 51/525 | 257/88 |
| 2011/0031491 | A1 * | 2/2011 | Yamazaki | H01L 27/1248 | 257/43 |
| 2011/0068334 | A1 * | 3/2011 | Yamazaki | H01L 27/1225 | 257/43 |
| 2011/0157679 | A1 * | 6/2011 | Fike, III | H01J 9/26 | 359/290 |
| 2011/0194062 | A1 * | 8/2011 | Lee | G02F 1/1339 | 349/149 |
| 2011/0221989 | A1 * | 9/2011 | Lee | G02F 1/134309 | 349/41 |
| 2011/0234967 | A1 * | 9/2011 | Kim | G02F 1/133351 | 349/155 |
| 2011/0285944 | A1 * | 11/2011 | Park | G02F 1/1345 | 349/110 |
| 2012/0019896 | A1 * | 1/2012 | Yoshida | G02F 1/167 | 359/296 |
| 2012/0033150 | A1 * | 2/2012 | Kim | G02F 1/1341 | 349/43 |
| 2012/0092585 | A1 * | 4/2012 | Byeon | H05K 5/0017 | 349/58 |
| 2012/0138979 | A1 * | 6/2012 | Lee | G02F 1/1339 | 257/91 |
| 2012/0159780 | A1 * | 6/2012 | Chan | G06F 3/0412 | 29/832 |
| 2013/0113670 | A1 * | 5/2013 | Chamseddine | H01Q 21/24 | 343/767 |
| 2013/0128210 | A1 * | 5/2013 | Nagasawa | G02F 1/1339 | 349/151 |
| 2013/0141289 | A1 * | 6/2013 | Vortmeier | H01Q 1/44 | 343/711 |
| 2013/0292586 | A1 * | 11/2013 | Teng | H01Q 9/27 | 250/504 R |
| 2014/0029212 | A1 * | 1/2014 | Hwang | G09F 9/301 | 361/749 |
| 2014/0063431 | A1 * | 3/2014 | Shih | G02F 1/1337 | 349/153 |
| 2014/0071368 | A1 * | 3/2014 | Kim | G02F 1/133516 | 349/46 |
| 2014/0346477 | A1 * | 11/2014 | Chao | H01L 27/322 | 257/40 |
| 2014/0374740 | A1 * | 12/2014 | Lou | H01L 27/1225 | 257/43 |
| 2015/0029428 | A1 * | 1/2015 | Wang | G02B 5/201 | 349/42 |
| 2015/0034155 | A1 * | 2/2015 | Lin | H01L 31/0687 | 136/256 |
| 2015/0090982 | A1 * | 4/2015 | Lin | H01L 27/3246 | 257/40 |
| 2015/0168788 | A1 * | 6/2015 | Song | G06F 3/0446 | 345/174 |
| 2015/0185539 | A1 * | 7/2015 | Senokuchi | G02F 1/133345 | 349/58 |
| 2015/0222014 | A1 * | 8/2015 | Stevenson | H01Q 13/18 | 342/372 |
| 2015/0222021 | A1 * | 8/2015 | Stevenson | H01Q 21/005 | 343/771 |
| 2015/0325634 | A1 * | 11/2015 | Chao | G02F 1/136227 | 349/43 |
| 2016/0139445 | A1 * | 5/2016 | Zhu | G02F 1/13394 | 349/106 |
| 2016/0149441 | A1 * | 5/2016 | Nayak | H01Q 21/06 | 307/149 |
| 2016/0291366 | A1 * | 10/2016 | Hara | G02F 1/1345 | |
| 2016/0365405 | A1 * | 12/2016 | Chen | H01L 27/1248 | |

(56) References Cited

U.S. PATENT DOCUMENTS

| | | | |
|---|---|---|---|
| 2017/0123253 A1* | 5/2017 | Sugita | G06F 3/0412 |
| 2017/0160866 A1* | 6/2017 | Tsai | G06F 3/0412 |
| 2018/0031888 A1* | 2/2018 | Yu | G02F 1/136227 |

FOREIGN PATENT DOCUMENTS

| | | | | |
|---|---|---|---|---|
| JP | 2004286998 | * | 3/2003 | G02F 1/1339 |
| JP | 2006350045 | * | 6/2005 | G02F 1/1339 |
| JP | 2006350045 A | * | 12/2006 | G02F 1/1339 |
| WO | 2017/061527 A1 | | 4/2017 | |

OTHER PUBLICATIONS

European Search Report dated Sep. 4, 2018, issued in application No. EP 18160284.8.
Chinese language office action dated Jun. 9, 2020, issued in application No. CN 201810180253.X.

* cited by examiner

US 11,133,580 B2

ANTENNA DEVICE

CROSS REFERENCE TO RELATED APPLICATIONS

This application claims the benefit of U.S. Provisional Application No. 62/551,267 filed on Aug. 29, 2017, and U.S. Provisional Application No. 62/523,336 filed on Jun. 22, 2017, the entirety of which are incorporated by reference herein.

BACKGROUND

Technical Field

The disclosure relates to an antenna device containing modulation material, and in particular it relates to an antenna device has a distance between the substrates thereof with better uniformity.

Description of the Related Art

Conventional antenna devices may have problems at a working temperature of a wide range (e.g. 20° C. to 200° C.). For example, when the modulation material of the antenna device comprises liquid crystal molecules, the volume of liquid-crystal molecules increases due to heat-expansion, which may increase the distance between the top substrate and the bottom substrate to degrade the performance of the device, and even cause the plate burst to break the antenna device. What is called for is a method for maintaining the distance between the substrates during the heat expansion of the liquid-crystal molecules so that the device can be successfully operated at different working temperatures.

BRIEF SUMMARY

One embodiment of the disclosure provides an antenna device, comprising a first substrate; a second substrate facing and spaced with the first substrate in a distance; at least one working element disposed between the first substrate and the second substrate, wherein the at least one working element is filled with a modulation material; and at least one buffer element connected with the at least one working element for adjusting the amount of the modulation material in the at least one working element.

One embodiment of the disclosure provides an antenna device with an active area, comprising a first substrate; a second substrate facing and spaced with the first substrate in a distance; a plurality of working elements disposed between the first substrate and the second substrate, and the plurality of working element disposed in the active area; a modulation material filled in the active area; and at least one buffer element connected with the active area for adjusting the amount of the modulation material in the active area.

One embodiment of the disclosure provides an antenna device, comprising a first substrate; a second substrate facing and spaced with the first substrate in a distance; at least one working element disposed between the first substrate and the second substrate, and the at least one working element is filled with a modulation material; and at least one first spacer is disposed out of the at least one working element.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION

The following description is made for the purpose of illustrating the general principles of the disclosure and should not be taken in a limiting sense. The scope of the disclosure is best determined by reference to the appended claims.

In one embodiment of this disclosure, for overcoming the problem caused by the heat expansion of the modulation material (e.g. includes but be not limited to liquid crustal molecules), a buffer element connected to the active area for adjusting the amount of the modulation material in the active area.

Figure 1A:
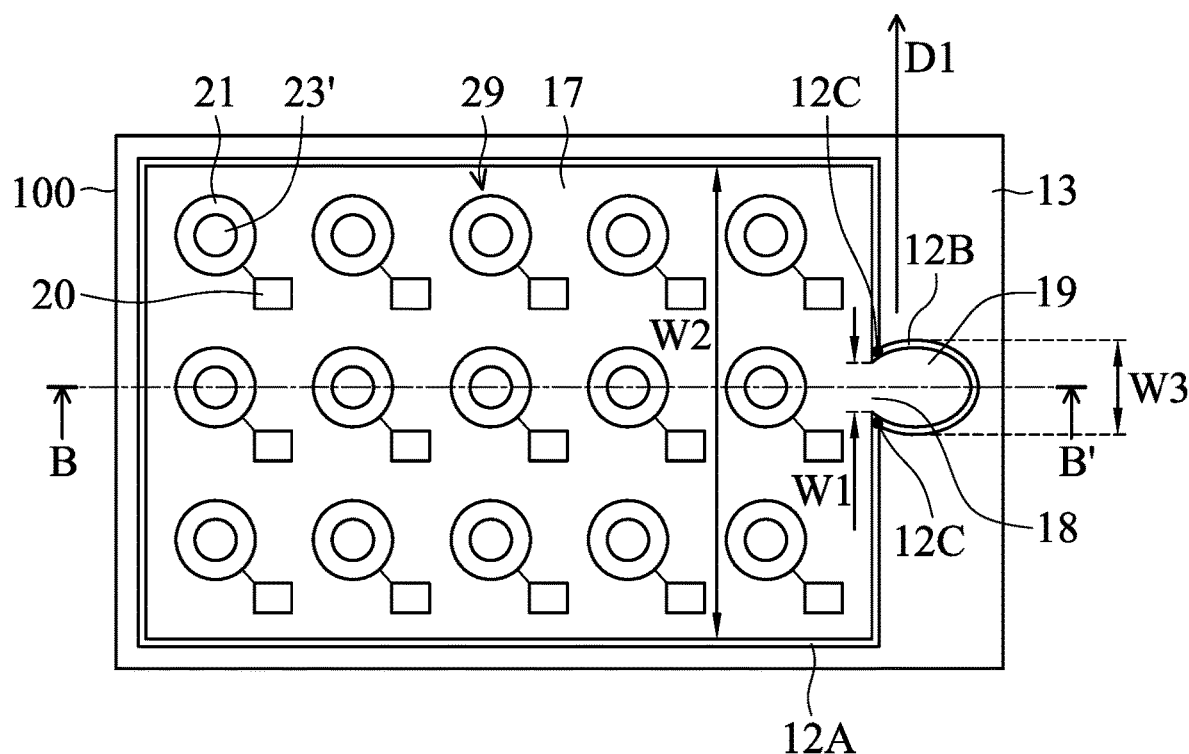
FIG. 1A shows a top-view of an antenna device in some embodiments of the disclosure.
Figure 1B:
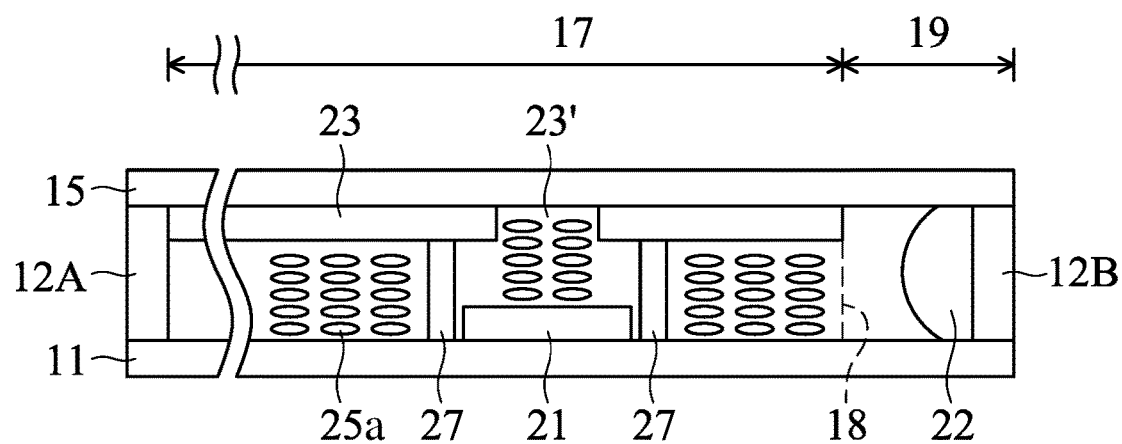
FIG. 1B shows a cross section of the antenna device along line B-B' in FIG. 1A.

FIG. 1A shows a top-view of an antenna device 100 with an active area 17 in some embodiments. A plurality of working elements 29 are disposed in the active area 17. FIG. 1B shows a cross section of the antenna device 100 with the active area 17 along line B-B' in FIG. 1A. In FIG. 1B, only one first electrode 21 and one slit 23' corresponding to the first electrode 21 are shown, and not all the first electrodes 21 and the slits 23' along line B-B' are shown, for simplicity. On the other hand, the number, the shape in top-view, and the arrangement of the first electrodes 21 and the corresponding slits 23' in FIG. 1A are only for illustration. One skilled in the art may adjust the number, the shape in top-view, and the arrangement of the first electrodes 21 and the corresponding slits 23' to meet design requirements without being limited to the manner in FIG. 1A.

As shown in FIGS. 1A and 1B, the first partition element 12A is disposed between the first substrate 11 and the second substrate 15 and surrounds the active area 17. The buffer element 19 includes a second partition element 12B disposed between the first substrate 11 and the second substrate 15, and the second partition element 12B is connected to the first partition element 12A. Note that that term "surround" does not mean that the first partition element 12A is totally enclosed, and the first partition element 12A could be a "C" shape. In some embodiments, the first partition element 12A and the second partition element 12B can be adhesive material, including but being not limited to sealant, adhesive dot, adhesive spacer, or double-side adhesive. Alternatively, the first partition element 12A and the second partition element 12B can be any material which may separate the first substrate 11 and the second substrate 15, including but be not limited to spacer. The first partition element 12A and the second partition element 12B can be formed together by spray coating, screen printing, or another suitable method. Note that if the first partition element 12A and the second partition element 12B are spacers, a seal (e.g. sealant or other adhesive material) could be disposed out of the first partition element 12A and the second partition element 12B for adhering the first substrate 11 and the second substrate 15. In other words, the seal 13 encloses the active area 17 and the buffer element 19. An opening 18 is located between the active area 17 and the buffer element 19. In FIGS. 1A and 1B, the buffer element 19 provides a space 22 for adjusting the amount of modulation material 25 disposed in the active area 17, the opening 18 provides a channel for the modulation material 25 to move or flow between the active area 17 and the buffer element 19. However, there can be more than one opening 18, and different openings 18 may be different sizes.

On the other hand, more buffer elements 19 can be connected to the active area 17. For example, four buffer elements 19 may be disposed on four respective sides of the active area 17, and these buffer elements 19 may be connected to the active area 17 through different respective openings 18. In this embodiment, the different buffer elements 19 may be different sizes, and the different openings 18 connecting the active area 17 and the different buffer elements 19 may be different sizes if necessary. In this embodiment, in view of a normal direction of the first substrate 11, the opening 18 has two end points 12C both connecting to the first partition element 12A and the second partition element 12B, a virtual connection line passes through the two end points 12C, a first direction D1 is parallel to the virtual connection line, and a width W1 of the opening 18 in the first direction D1 is less than a width W2 of the active area 17 in the first direction D1. In another embodiment, the width W1 of the opening 18 in the first direction D1 is less than the width W3 of the buffer element 19. In this embodiment, the active area 17 could be filled with the modulation material, but be not limited to.

The working element 29 includes at least one first electrode 21 disposed on the first substrate 11, and a second electrode 23 disposed on the second substrate 15. In this embodiment, a plurality of working elements 29 corresponding to a plurality of first electrodes 21 disposed in the active area 17, and the first partition element 12A surrounds the area where the plurality of first electrodes 21 are disposed. The second electrode 23 has a plurality of slits 23', and each of the slits 23' respectively corresponds to one of the first electrodes 21, as shown in FIG. 1B. Furthermore, a part of the at least one of the first electrode 21 overlaps the second electrode 23. Each of the first electrodes 21 may be electrically connected to a corresponding functional circuit 20. In some embodiments, the functional circuits 20 and the first electrodes 21 can be simultaneously disposed on the top surface of the first substrate 11. Alternatively, the functional circuits 20 can be disposed on the bottom surface of the first substrate 11, and the electrical connection between the first electrodes 21 and the functional circuits 20 includes vias (not shown) penetrating through the first substrate 11. In a further embodiment, the functional circuits 20 can be outside the first partition element 12A and not disposed in the active area 17. Each of the plurality of working elements 29 filled with the modulation material 25.

In some embodiments, the antenna device 100 is a liquid-crystal antenna device, it means that the modulation material 25 comprises liquid crystal molecules. The functional circuits 20 may supply voltages to the first electrodes 21, and thereby the electric field of the first electrodes 21 may change the orientation of the liquid crystal molecules 25*a* between the first electrodes 21 and the second electrode 23. On the other hand, the functional circuits 20 may also supply another voltage to the first electrodes 21 so that the first electrodes 21 may emit electromagnetic signals through the slits 23', and the direction of the electromagnetic signals can be adjusted by the orientation of the liquid crystal molecules 25*a*. The second electrode 23 can be electrically floated, connected to ground, or connected to another circuit (not shown). The second electrode 23 functions to shield the electromagnetic signals, so the electromagnetic signals could be emitted toward the slit 23' for enhancing the signal/noise ratio of the electromagnetic signals. In FIGS. 1A and 1B, the second electrode 23 is the whole sheet of a layer with slits 23' that respectively correspond to the separated first electrodes 21. In another embodiment, the second electrodes 23 with different slits 23' are not connected to each other, and are respectively connected to different circuits. In other words, each of the separated second electrodes 23 (e.g. ring-shaped) respectively has a slit 23'. Note that the design of the disclosure is not only used for the antenna device such as the liquid-crystal antenna, but also any device that includes liquid crystal molecules, such as modulation device, phase shifter, variable capacitor or tunable resonator. Any device that has a problem wherein the distance between the top substrate and the bottom substrate is changed by the temperature variation falls within the scope of the disclosure.

Figure 1C:
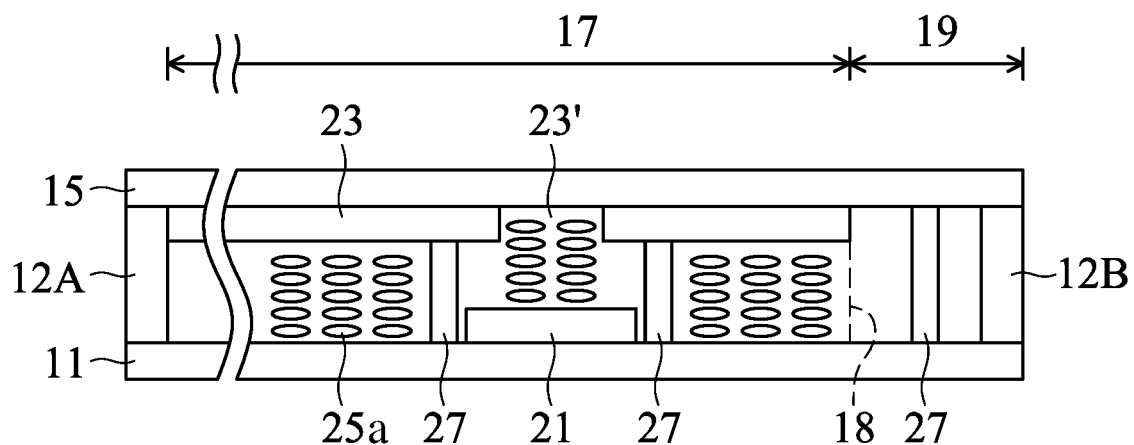
FIG. 1C shows a cross section of an antenna device in some embodiments of the disclosure.

In some embodiments, spacers 27 can be formed between the first substrate 11 and the second substrate 15 to stabilize the distance between the first substrate 11 and the second substrate 15 in the active area 17. In general, the spacers 27 can be placed adjacent to the first electrodes 21 to ensure the stability of the distance between the substrates near the first electrodes 21 and the slits 23'. In addition, the spacers 27 can also be formed at other positions in the active area 17. The spacers 27 can be column-shaped, wall-shaped, or block-shaped and have a larger area, as long as the spacers 27 do not overlap the slits 23' and the first electrodes 21. Not only do the spacers 27 stabilize the distance between the substrates in the active area 17, they also reduce the amount of liquid crystal molecules that is required. In some embodiments, the spacers 27 are made of photoresist, and their positions and shapes can be defined by a lithography process. Alternatively, the spacers 27 may be made of an adhesive material (e.g. a material that is similar to sealant), which can be formed by spray coating, screen coating, or another suitable coating method. In other embodiment, the spacers 27 may be disposed corresponding to the buffer element 19 as shown in FIG. 1C, to control the cell gap of the buffer element 19. In some embodiments, the spacers 27 may be disposed at the opening 18, it is used as a latch structure for controlling the amount of the modulation material 25. Furthermore, the spacers 27 include a first spacer and a second spacer which are disposed staggered in view of the normal direction of the first substrate, it will have better control ability than only one spacer disposed at the opening 18. The spacers 27 can be made of, but be not limited to, a single material or a composite layer of materials, such as polyethylene terephthalate (PET), polyethylene (PE), polyethersulfone (PES), polycarbonate (PC), polymethylmethacrylate (PMMA), or glass.

In some embodiments, the active area 17 is used for containing the modulation material 25, and the buffer element 19 is used for containing an increased amount of the modulation material 25 during heat expansion. But when temperature drops and the amount of the modulation material 25 in the active area 17 reduces, part of the modulation material 25 in the buffer element 19 could flow back to the active area 17. The buffer element 19 could be designed to have enough cavity to accommodate the overflow of the modulation material 25. In some embodiment, in view of a normal direction of the first substrate 11, a ratio of an area of the buffer element 19 to an area of the active area 17 is greater than 0.01 and less than 0.5. The area of the active area 17 could be a region defined by the first partition element 12A and the virtual connection line between end points 12C of the opening 18, and the area of the buffer element 19 could be a region defined by the second partition element 12B and the virtual connection line of the two end points 12C of the opening 18. In another embodiment, the active area 17 has a first cavity, which is an accommodation space defined by the first substrate 11, the first electrode 21, the second substrate 15, the second electrode 23, the first partition element 12A and the virtual connection line of the two end points 12C of the opening 18. The buffer element 19 has a second cavity, which is an accommodation space defined by the first substrate 11, the second substrate 15, the second partition element 12B and the virtual connection line of the two end points 12C of the opening 18. The ratio of the second cavity to the first cavity is greater than 0.01 and less than 0.5. In some embodiment, the antenna device 100 is operated at a working temperature between a first temperature and a second temperature, such as 20° C. to 200° C. The modulation material 25 at the second temperature (e.g. 200° C.) could have more volume X than that of the modulation material 25 at the first temperature (e.g. 20° C.), the volume X is the CTE (coefficient of thermal expansion) of the liquid crystal molecules 25a cross the difference between the first temperature and the second temperature. The buffer element 19 is preferably designed to have enough space for containing the increased volume X of modulation material 25 during heat expansion. If the second cavity is too small, the increased volume X of modulation material 25 cannot be completely contained during heat expansion, meaning that the problem of an increasing distance between the substrates, or even a burst plate, cannot be avoided. If the second cavity is too large, space will be wasted and the size of the antenna device 100 will increase.

In some embodiments, the first electrodes 21 can be formed on the first substrate 11 by following these steps. A conductive layer is deposited, and then patterned by lithography and etching processes to form the first electrodes 21. In some embodiments, the conductive layer can be metal, alloy, or transparent conductive oxide (e.g. indium tin oxide, aluminum zinc oxide, or the like). Subsequently, the spacers 27 are formed on the first substrate 11. The spacers 27 can be composed of photoresist, which can be defined by a lithography process. Alternatively, the spacers 27 can be composed of an adhesive material, which can be formed by spray coating, screen coating, or another suitable coating method. In addition, the functional circuits 20 can be formed by suitable processes, and the processes are based on the structure and position of the functional circuits 20. Subsequently, the first partition element 12A and the second partition element 12B are coated on the frame of the first substrate 11. If the spacers 27, the first partition element 12A and the second partition element 12B are composed of the same adhesive material, the spacers 27, the first partition element 12A and the second partition element 12B can be formed simultaneously. Thereafter, the first substrate 11 is put into a vacuum chamber, and the modulation material 25 is filled into the active area 17 surrounded by the first partition element 12A. If the filling step is performed at a temperature over 20° C., the modulation material 25 should be further filled into a part of the buffer element 19. As such, during cold contraction, the modulation material 25 could be completely fill the active area 17 even if the antenna device 100 is cooled down to 20° C.

The second electrode 23 can be formed on the second substrate 15 before, during, or after the above steps. The second electrode 23 is then patterned by lithography and etching processes to form the slits 23'. The second electrode 23 may include metal, metal oxide, carbon material, or another suitable electromagnetic transmission material. Subsequently, the second substrate 15 is adhered to the first substrate 11 in a distance to complete the antenna device 100. Because the modulation material 25 has a strong cohesive force, the modulation material 25 in the active area 17 will connect to the modulation material 25 in the buffer element 19 (if it exists). Although some part of the buffer element 19 not filled with the modulation material 25 is vacuum, the vacuum pulling force is still less than the cohesive force of the modulation material 25. In other words, the space of vacuum part of the buffer element 19 not filled with the modulation material 25 will not enter the active area 17 by the opening 18 in the antenna device 100. After the first substrate 11 adhering to the second substrate 15 in a distance, the active area 17 will be filled with the modulation material 25 (e.g. liquid crystal molecules) at any working temperature. The increased volume of modulation material 25 during heat expansion may enter the buffer element 19 by the opening 18. When the temperature of the antenna device 100 is cooled down, during the cold contraction, the modulation material 25 in the buffer element 19 may flow or move to the active area 17 through the opening 18.

Figure 2A:
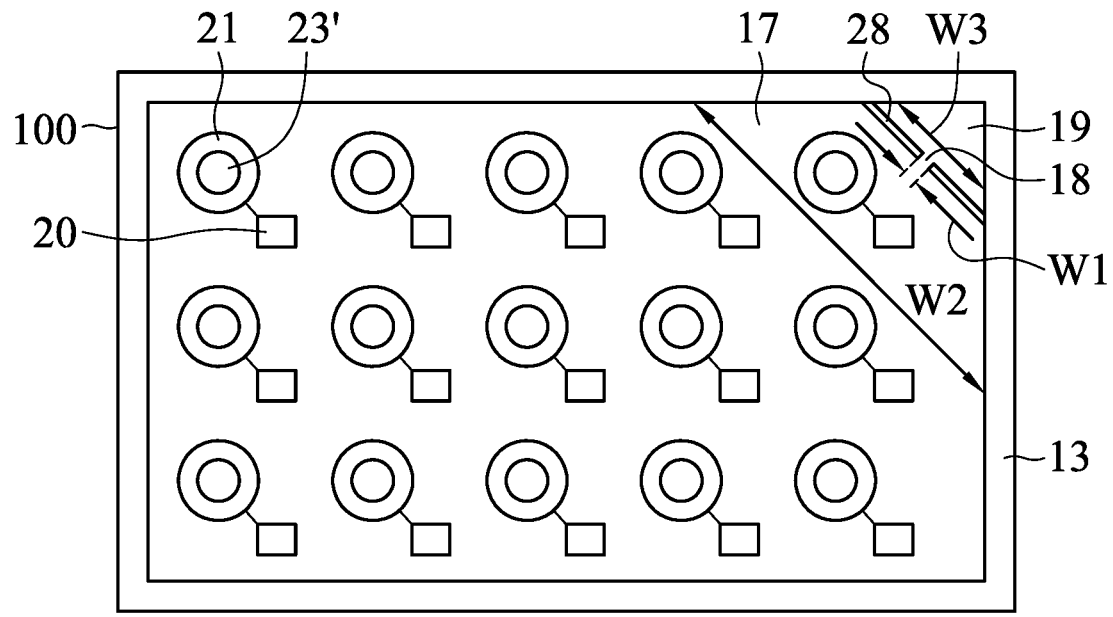
FIG. 2A shows a top-view of an antenna device in some embodiments of the disclosure.
Figure 2B:
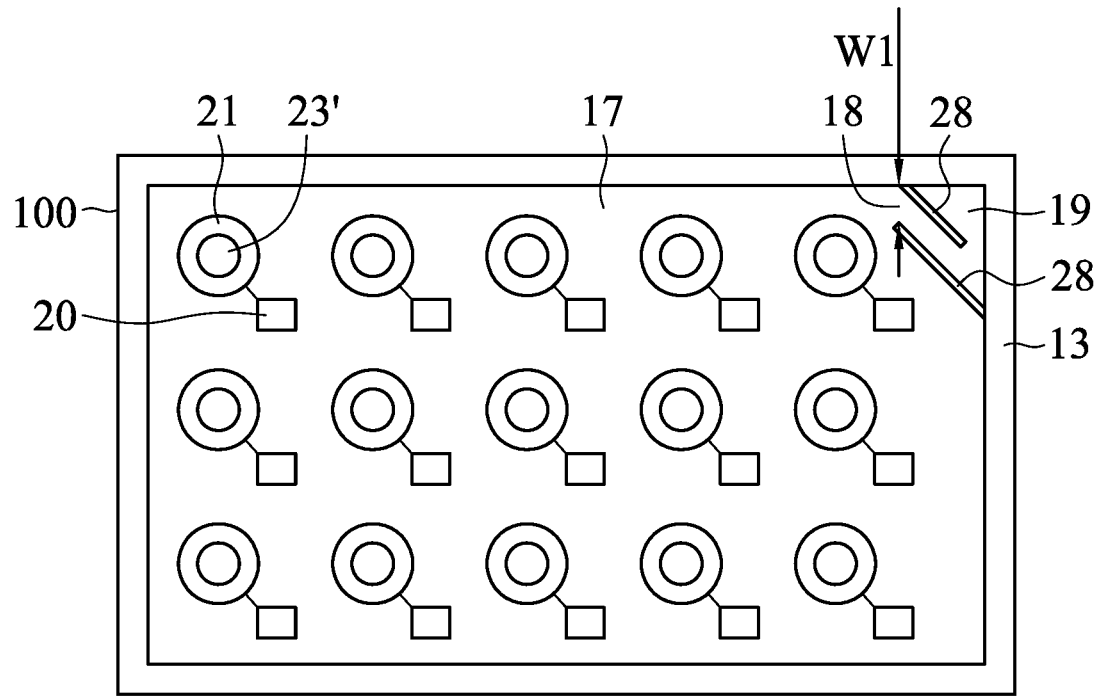
FIG. 2B shows a top-view of an antenna device in some embodiments of the disclosure.

In another embodiment, the active area 17 and the buffer element 19 are separated by at least a block wall 28 as shown in FIGS. 2A and 2B, and an opening 18 is defined by the block wall 28 to connect the active area 17 with the buffer element 19. In FIG. 2A, only one single opening 18 is disposed between the two block walls 28. However, there can be more than one opening 18, and different openings 18 may be different sizes. Although the buffer element 19 is disposed at the corner of the first substrate in FIG. 2A, the buffer element 19 can be disposed at other positions. In addition, more buffer elements 19 can be connected to the active area 17. For example, four buffer elements 19 may be disposed on four respective corners of the first substrate 11, and these buffer elements 19 are connected to the active area 17 through different respective openings 18. In this embodiment, different buffer elements 19 may be different sizes, and the different openings 18 connecting the active area 17 and the different buffer elements 19 may be different sizes if necessary. In FIG. 2A, a virtual connection line pass through the two end points of the opening 18 is parallel to the block walls 28, the first direction D1 is parallel to the virtual connection line, and width W1 of the opening 18 in the first direction D1 is less than a width W2 of the active area 17 in the first direction D1. Furthermore, the width W1 of the opening 18 in the first direction D1 is also less than a width W3 of the buffer element 19 in the first direction D1. Whatever the position of the buffer element 19 is, the active area 17 and the buffer element 19 are separated by the block walls 28, and the opening 18 is defined by the block walls 28 to connect the active area 17 with the buffer element 19. In some embodiments, the block walls 28 can be an adhesive material (e.g. sealant), which can be formed by spray coating, screen coating, or another suitable coating method. Alternatively, the block walls 28 can be photoresist, which can be defined by a lithography process. When both the block walls 28 and the spacers 27 are made of photoresist, the block walls 28 and the spacers 27 can be simultaneously defined by a lithography process. When both the block walls 28 and the first partition element 12A (or the seal 13) are made of the same adhesive material, the block walls 28 and the first partition element 12A (or the seal 13) can be formed simultaneously. In FIG. 2B, it is another embodiment of the design of the block walls 28, in which the block walls 28 are staggered to form an opening 18 between the block walls 28.

Figure 3A:
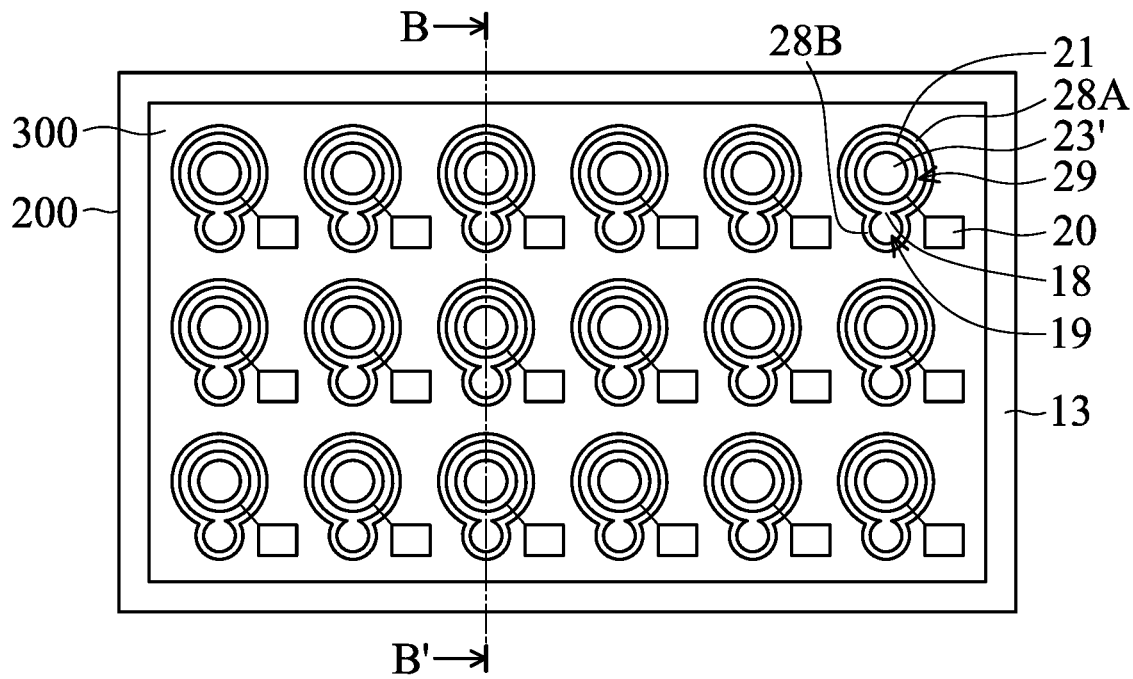
FIG. 3A shows a top-view of an antenna device in some embodiments of the disclosure.
Figure 3B:
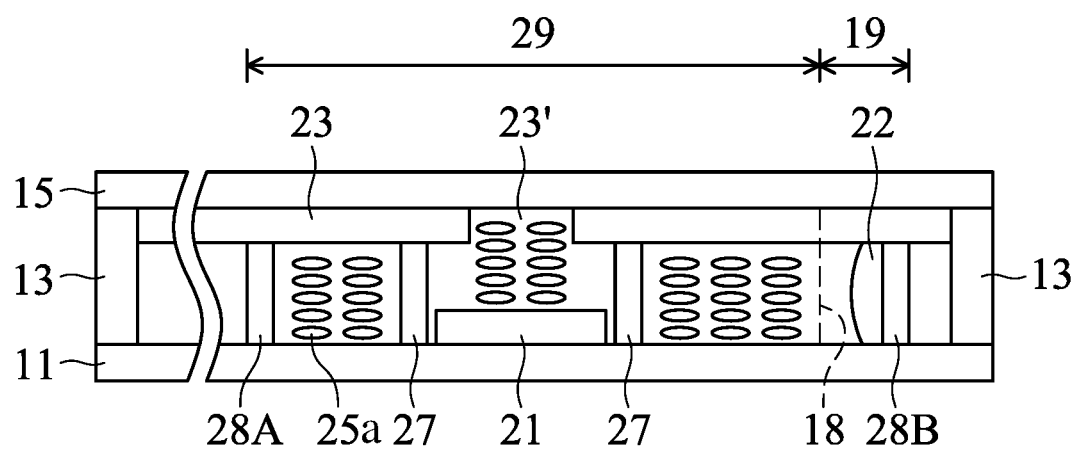
FIG. 3B shows a cross section of the antenna device along line B-B' in FIG. 3A.

FIG. 3A shows a top-view of an antenna device 200 in some embodiments. FIG. 3B shows a cross section of the antenna device 200 along line B-B' in FIG. 3A. In FIG. 3B, only one modulation element 300 is shown, and not all the modulation elements 300 along line B-B' are shown, for simplicity. On the other hand, the number and arrangement of the modulation elements 300 and the top-view of the first electrodes 21 and the corresponding slits 23' in the modulation elements 300 of FIG. 3A are only for illustration. One skilled in the art may adjust the number and arrangement of the modulation elements 300 and the top-view of the first electrodes 21 and the corresponding slits 23' to meet design requirements without being limited to the manner in FIG. 3A.

As shown in FIGS. 3A and 3B, the seal 13 may adhere the first substrate 11 and the second substrate 15 to surround a plurality of modulation elements 300. In some embodiments, the seal 13 is adhesive material, which can be formed by spray coating, screen printing, or another suitable coating method. Each of the modulation elements 300 includes at least one working element 29 and at least one buffer element 19, the at least one working element 29 is filled with a modulation material 25, at least one buffer element 19 is connected with the at least one working element 29 for adjusting the amount of the modulation material 25 in the at least one working element 29. The at least one working element 29 includes a first partition element 28A disposed between the first substrate 11 and the second substrate 15, the at least one buffer element 19 includes a second partition element 28B disposed between the first substrate 11 and the second substrate 15, and the second partition element 28B is connected to the first partition element 28A. An opening 18 is between the working element 29 and the buffer element 19. In some embodiments, the first partition element 28A and the second partition element 28B can be an adhesive material (e.g. similar to the adhesive), which can be formed by spray coating, screen coating, or another suitable coating method. Alternatively, the first partition element 28A and the second partition element 28B can be photoresist, which can be defined by a lithography process. Alternatively, the first partition element 28A and the second partition element 28B can be spacers. In FIG. 3A, the working element 29 is connected to the buffer element 19 through the single opening 18. However, there can be more than one opening 18, and different openings 18 may be different sizes. On the other hand, more buffer elements 19 can be connected to the working element 29. For example, four buffer elements 19 may be disposed on four respective sides of the working element 29, and these buffer elements 19 are connected to the working element 29 through different respective openings 18. In this embodiment, the different buffer elements 19 may be different sizes, and the different openings 18 connecting the working element 29 and the different buffer elements 19 may be different sizes if necessary.

In the working element 29 of each of the modulation elements 300, at least a first electrode 21 is disposed on the first substrate 11, and a second electrode 23 is disposed on the second substrate 15. The second electrode 23 has at least one slit 23', the at least one slit 23' respectively corresponds to the at least one first electrode 21, as shown in FIG. 3B. In this embodiment, the working element 29 includes one first electrode 21 corresponding to one slit 23', so the first partition element 28A surrounds the area where the one first electrode 21 located. Alternatively, the working element 29 could include two or more first electrodes 21, so the first partition element 28A surrounds an area where the two or more first electrodes 21 located. Note that the term "surround" does not mean that the first partition element 28A totally enclose, and the first partition element could be a "C" shape so that the modulation material 25 could move or flow between the working element 29 and the buffer element 19. The first electrode 21 may be electrically connected to a corresponding functional circuit 20. In some embodiments, the functional circuit 20 and the first electrode 21 can be simultaneously disposed on the top surface of the first substrate 11, and the functional circuit 20 is outside the first partition element 28A. Alternatively, the functional circuits 20 can be disposed on the bottom surface of the first substrate 11, and the electrical connection between the first electrodes 21 and the functional circuit 20 includes vias (not shown) penetrating through the first substrate 11. In a further embodiment, the functional circuits 20 can be outside the seal 13.

In some embodiments, the antenna device 200 is a liquid-crystal antenna device including a plurality of modulation elements 300. In each of the modulation elements, the functional circuit 20 may supply voltage to the first electrode 21, and the electric field of the first electrode 21 can thereby change the orientation of the modulation material 25 (e.g. liquid crystal molecules) between the first electrode 21 and the second electrode 23. On the other hand, the functional circuit 20 may also supply another voltage to the first electrode 21 causing the first electrode 21 to emit electromagnetic signals through the slit 23', and the direction of the electromagnetic signals can be adjusted by the orientation of the modulation material 25. The second electrode 23 can be electrically floated, connected to ground, or connected to another circuit (not shown). The second electrode 23 functions to shield the electromagnetic signals, so the electromagnetic signals can be emitted toward to the slit 23' for enhancing the signal/noise ratio of the electromagnetic signals. In FIGS. 3A, 3B and 3F, the second electrode 23 is the whole sheet of a layer with slits 23' that correspond to the respective separated first electrodes 21. Alternatively, the second electrode 23 with different slits 23' are not connected to each other, and are connected to different respective circuits. In other words, each of the separated second electrodes 23 (e.g. ring-shaped) has a respective slit 23'. Note that the design of the disclosure is not only used for an antenna device such as a liquid-crystal antenna device, but also any device that includes liquid crystal molecules, such as modulation device, phase shifter, variable capacitor or tunable resonator. Any devices that experience problems wherein the distance between the top substrate and the bottom substrate can be changed by the temperature belong within the scope of this disclosure.

Figure 3C:
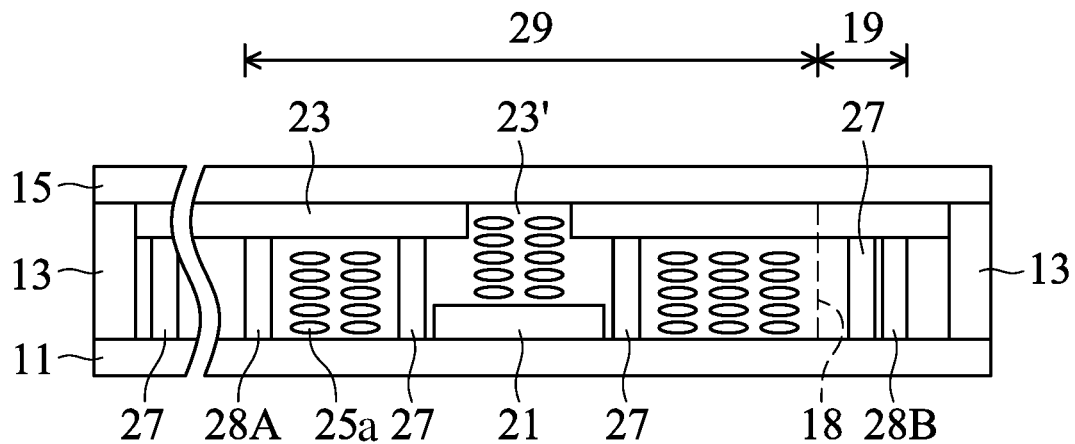
FIG. 3C shows a cross section of an antenna device in some embodiments of the disclosure.
Figure 3D:
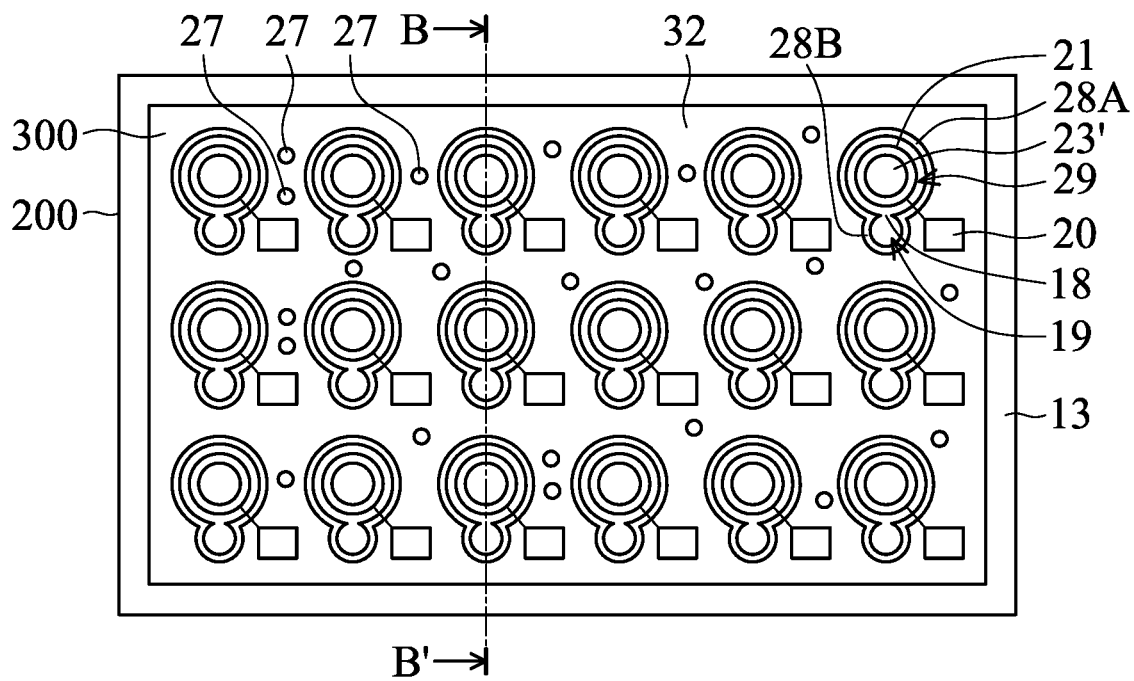
FIG. 3D shows a top-view of an antenna device in some embodiments of the disclosure.

In some embodiments, spacers 27 can be formed between the first substrate 11 and the second substrate 15 to stabilize the distance between the first substrate 11 and the second substrate 15 in the working element 29. In general, the spacers can be disposed in the working element 29 and adjacent to the first electrodes 21 to ensure the stability of the distance between the substrates near the first electrodes 21 and the slits 23'. In addition, the spacers 27 can also be formed at positions outside the working element 29, e.g. outside the first partition element 28A and the second partition element 28B, as shown in FIGS. 3C and 3D, to further maintain the uniformity of the cell gap in the working element 29 and out of the working element 29. In other words, the active area 17 comprising a non-working area 32 between at least two working elements 29 of modulation element 300, and there are spacers 27 disposed in the non-working area 32. In some embodiments, the spacers 27 disposed between the first substrate 11 and the second substrate 15 could be different material, different thickness, or different stiffness, or the projection area of the spacers 27 on the first substrate 11 (or the second substrate 15) could be different. For example, the spacers 27 with high stiffness (or with larger projection area) could be used to maintain the cell gap between the first substrate 11 and the second substrate 15, and the spacers 27 with low stiffness could be used as cushion between the first substrate 11 and the second substrate 15 when the antenna device is collided, it can protect the working element 29, too. In other embodiment, the spacers 27 may be disposed corresponding to the buffer element 19 to control to cell gap of the buffer element 19. The spacers 27 can be column-shaped, wall-shaped, or block-shaped and have a larger area, as long as the spacers 27 do not overlap the slits 23' and the first electrodes 21. Not only do the spacers 27 stabilize the distance between the substrates in the working element 29, they also reduce the amount of modulation material 25 that is required. In some embodiments, the spacers 27 are made of photoresist, and their positions and shapes can be defined by a lithography process. Alternatively, the spacers 27 may be made of an adhesive material (e.g. sealant), which can be formed by spray coating, screen coating, or another suitable coating method. The spacers 27 are made of but not limited to single material or a composite layer of materials, such as polyethylene terephthalate (PET), polyethylene (PE), polyethersulfone (PES), polycarbonate (PC), polymethylmethacrylate (PMMA), or glass.

In FIG. 3B, the working element 29 is used for containing the modulation material 25, and the buffer element 19 is used for providing a space 22 for adjusting the amount of the modulation material 25. The buffer element 19 could be designed to have enough cavity to accommodate the overflow of the modulation material 25. In some embodiment, in view of a normal direction of the first substrate 11, a ratio of an area of the buffer element 19 to an area of the working element 29 is greater than 0.01 and less than 0.5. In another embodiment, the working element 29 has a first cavity which is an accommodation space defined by the first substrate 11, the first electrode 21, the second substrate 15, the second electrode 23, the first partition element 28A and the virtual connection line of the two end points of the opening 18. The buffer element 19 has a second cavity which is an accommodation space defined by the first substrate 11, the second substrate 15, the second partition element 28B and the virtual connection line of the two end points of the opening 18. The ratio of the second cavity to the first cavity is greater than 0.01 and less than 0.5. In some embodiment, the antenna device 200 is operated at a working temperature between a first temperature and a second temperature, such as 20° C. to 200° C. The modulation material 25 at the second temperature (e.g. 200° C.) could have more volume X than that of the modulation material 25 at the first temperature (e.g. 20° C.), the volume X is the CTE (coefficient of thermal expansion) of the modulation material 25 cross the difference between the first temperature and the second temperature, the buffer element 19 is preferably designed to have enough space for containing the increased volume X of the modulation material 25 during heat expansion. If the second cavity is too small, the increased volume X of modulation material 25 during heat expansion cannot be completely contained, and so problems such as a burst plate and having an increased distance between substrates cannot be avoided. If the second cavity is too large, space will be wasted and the volume of the modulation element 300 and of the antenna device 200 will increase.

Figure 3E:
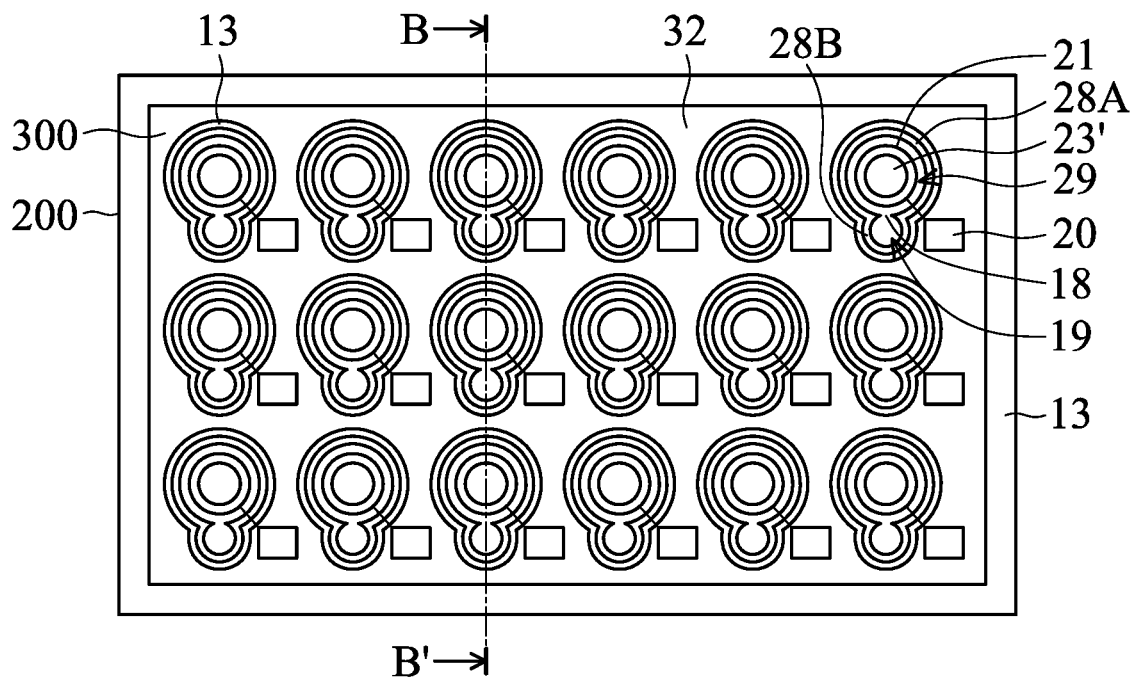
FIG. 3E shows a top-view of an antenna device in some embodiments of the disclosure.

In some embodiments, the first electrodes 21 can be formed on the first substrate 11 by following these steps. A conductive layer is deposited, and then patterned by lithography and etching processes to form the first electrodes 21. In some embodiments, the conductive layer can be metal, alloy, or transparent conductive oxide (e.g. indium tin oxide, aluminum zinc oxide, or the like). Subsequently, the spacers 27, the first partition element 28A and the second partition element 28B are formed on the first substrate 11. The spacers 27, the first partition element 28A and the second partition element 28B can be composed of photoresist, which can be defined by a lithography process. Alternatively, the spacers 27, the first partition element 28A and the second partition element 28B can be composed of an adhesive material (for example, sealant), which can be formed by spray coating, screen coating, or another suitable method. In some embodiments, one of the spacers 27, the first partition element 28A and the second partition element 28B is photoresist, and another one is an adhesive material. As such, the one (photoresist) can be defined by lithography, and the other one (adhesive material) can be defined by spray coating, screen coating, or another suitable coating method. In addition, the functional circuits 20 can be formed by suitable processes, and the processes are based on the structure and position of the functional circuits 20. Subsequently, the seal 13 is coated on the frame of the first substrate 11. If the spacers 27 (and/or the first partition element 28A and the second partition element 28B) and the seal 13 are composed of the same adhesive material, the spacers 27 (and/or the first partition element 28A and the second partition element 28B) and the seal 13 can be formed simultaneously. Note that in another embodiment as shown in FIG. 3E, the seal 13 could be screen printing on the first substrate 11 (or the second substrate 15) after forming the first partition element 28A and the second partition element 28B on the first substrate 11 (or the second substrate 15), and the seal 13 encloses the first partition element 28A and the second partition element 28B. The material of the seal 13 could be sealant, and the first partition element 28A not only used for maintaining the distance between substrates but also surrounds the modulation material 25 so that the modulation material 25 will not contact the seal 13, thereby preventing the modulation material 25 from being polluted by the seal 13. Thereafter, the first substrate 11 is put into a vacuum chamber, and the modulation material 25 is filled into the working element 29 surrounded by the first partition element 28A. If the filling step is performed at a temperature over 20° C., the modulation material 25 should be filled into a part of the buffer element 19. As such, the modulation material 25 during cold contraction could be completely fill the working element 29 even if the antenna device 200 is cooled down to 20° C.

The second electrode 23 can be formed on the second substrate 15 before, during, or after the above steps. The second electrode 23 is then patterned by lithography and etching processes to form the slits 23'. The second electrode 23 may include metal, metal oxide, carbon material, or another suitable electromagnetic transmission material. Subsequently, the second substrate 15 is adhered to the first substrate 11 to complete the antenna device 200. Because the modulation material 25 has a strong cohesive force, the modulation material 25 in the working element 29 will connect to the modulation material 25 in the buffer element 19 (if it exists). Although some part of the buffer element 19 not filled by the modulation material 25 is vacuum, the vacuum pulling force is still less than the cohesive force of the modulation material 25. In other words, a space 22 of the vacuum part of the buffer element 19 not filled by the modulation material 25 will not enter the working element 29 by the opening 18 in the phase modulation element 300. After the first substrate 11 and the second substrate 15 being adhered by the seal 13, the working element 29 is filled with the modulation material 25 at any working temperature. The increased volume of modulation material 25 during heat expansion may enter the buffer element 19 by the opening 18. When the temperature of the antenna device 200 is cooled down, the modulation material 25 in the buffer element 19 during the cold contraction may return to the working element 29 by the opening 18.

Compared to the antenna device 100 in FIGS. 1A, 1B, 2A and 2B, the non-working area 32 between the first partition elements 28A in the antenna device 200 in FIG. 3D is free of the modulation material 25, thereby reducing the amount of the modulation material 25. In some embodiments, the modulation material 25 may occupy the non-working area 32 between the first partition elements 28A.

Figure 4A:
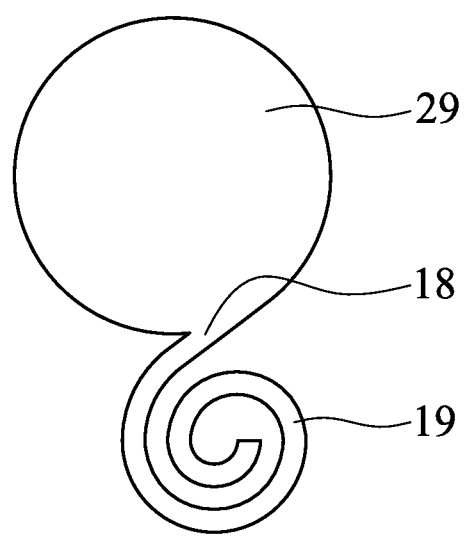
FIGS. 4A to 4I show top-views of the working elements and the buffer elements in some embodiments of the disclosure.
Figure 4B:
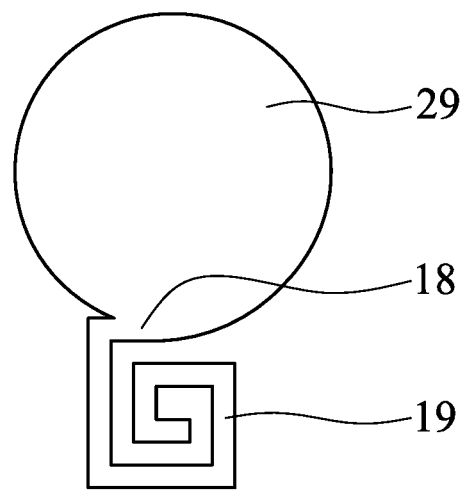
Figure 4C:
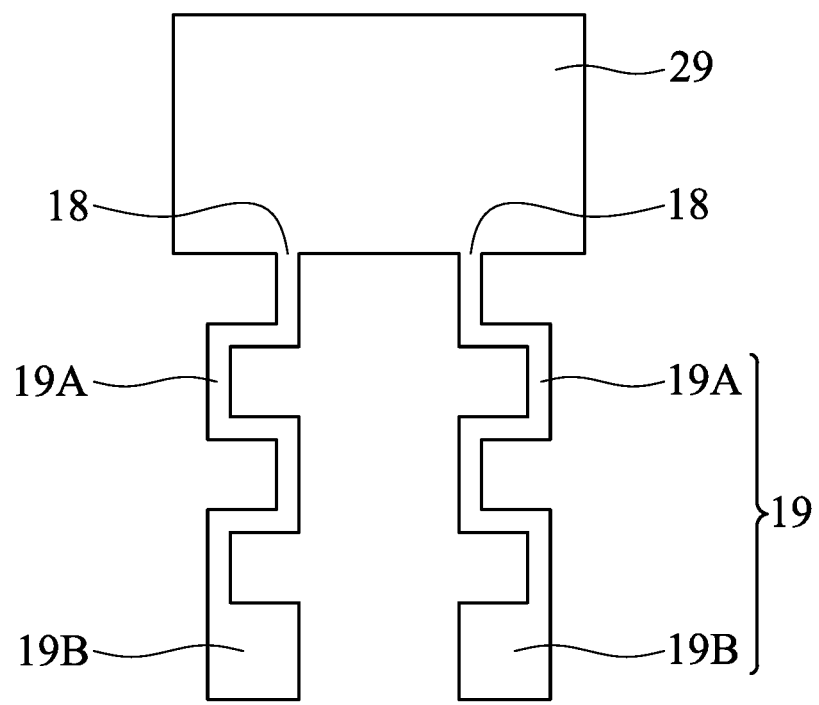
Figure 4D:
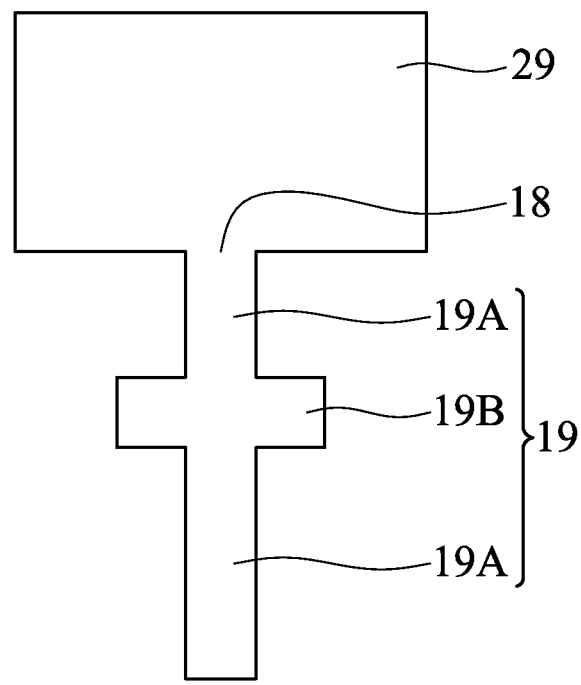
Figure 4E:
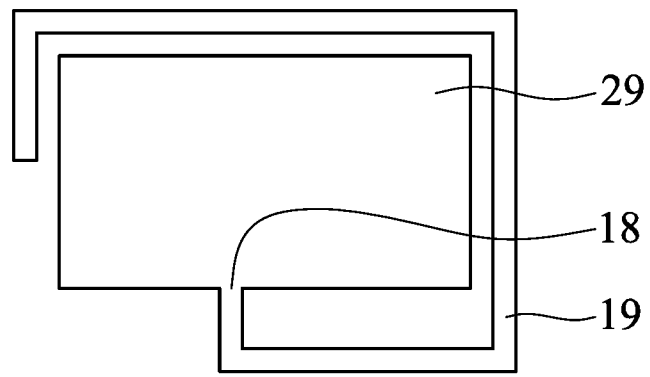
Figure 4F:
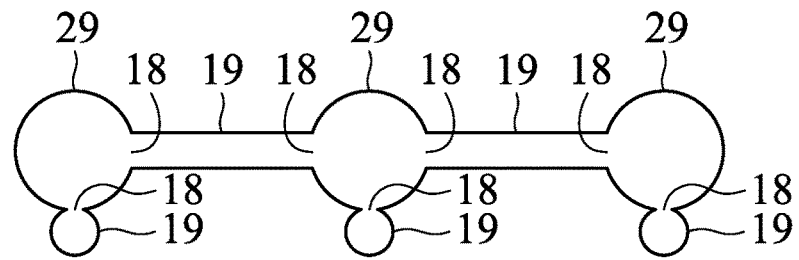
Figure 4G:
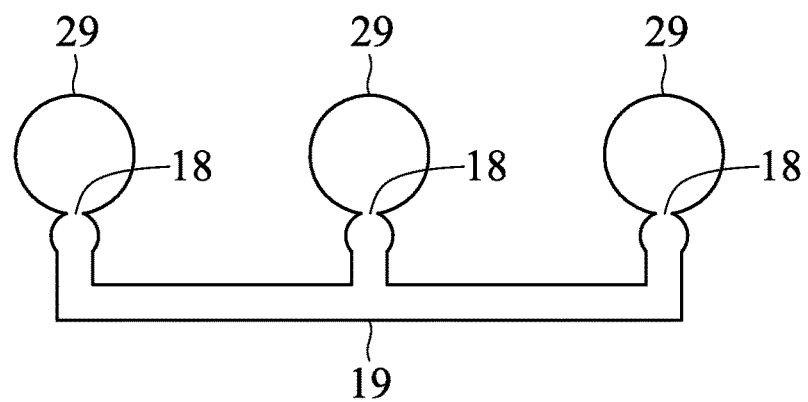
Figure 4H:
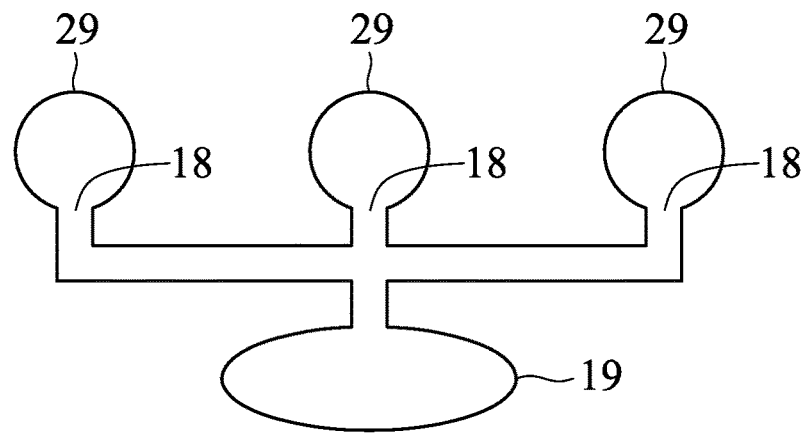
Figure 4I:
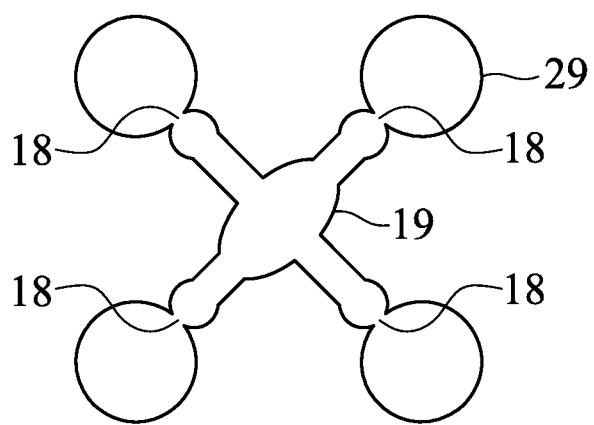

FIGS. 4A to 4I show top-views of the working elements 29 and buffer elements 19 in some embodiments of the disclosure. In some embodiments, the buffer element 19 is a circular spiral pipe region, as shown in FIG. 4A. In some embodiments, the buffer element 19 is a square spiral pipe region, as shown in FIG. 4B. In some embodiments, the buffer element 19 includes two zigzag pipe regions 19A and two pool regions 19B respectively disposed at the ends of the two zigzag pipe regions 19A, as shown in FIG. 4C. In some embodiments, the buffer element 19 includes a linear pipe region 19A and a pool region 19B disposed between the opening 18 and the end of the linear pipe region 19A, as shown in FIG. 4D. In some embodiments, the buffer element 19 is a pipe region rounding the perimeter of the working element 29, as shown in FIG. 4E. In other embodiments, the working element 29 may have the shape of a triangle, square, hexagon, octagon, oval, teardrop, or another shape. Alternatively, there can be more than one opening 18 between the buffer element 19 and the working element 29. For example, the single pool region 19B (or a plurality of the pool regions 19B) can be connected to the working element 29 through a plurality of pipe regions 19A and corresponding opening 18. In addition, there can be more than one pool region 19B between the opening 18 and the end of the pipe region 19A. In other embodiments, the pool region 19B may have the shape of a triangle, hexagon, octagon, oval, teardrop, or another shape. In FIG. 4E, the pipe-shaped buffer element 19 rounds about ¾ perimeter of the working element 29. Alternatively, the pipe-shaped buffer element 19 may round more (e.g. two or more) or less (e.g. ½) perimeter of the working element 29. On the other hand, if a plurality of pipe-shaped buffer elements 19 are connected to the working element 29, the openings 18 corresponding to each of the buffer elements 19 may be the same size or different sizes, and each of the buffer elements 19 may be the same size or different sizes, depending on requirements. In some embodiment, the different working elements 29 are connected by the buffer elements 19, as shown in FIG. 4F. In some embodiments, the buffer elements 19 (corresponding to different working elements 29) are connected by a pipe-shaped buffer element 19, as shown in FIG. 4G. In some embodiments, the different working elements 29 are connected to a single buffer element 19, as shown in FIGS. 4H and 4I. In some embodiments, the buffer element 19 could be not enclosed and have an open end, it means the end of the buffer element 19 away from the opening 18 is open. In this disclosure, the design of the end of the buffer element is not limited, one skilled in the art could design it by demand.

Figure 5A:
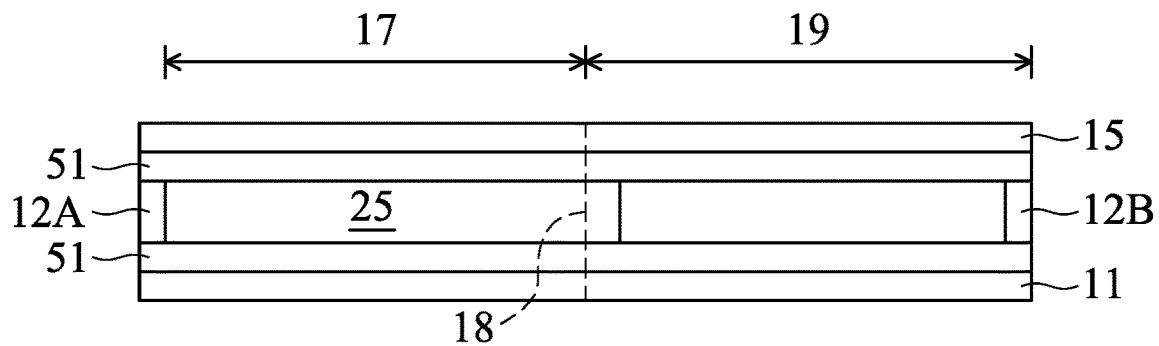
FIGS. 5A to 5C show cross-sections of antenna devices in some embodiments of the disclosure.
Figure 5B:
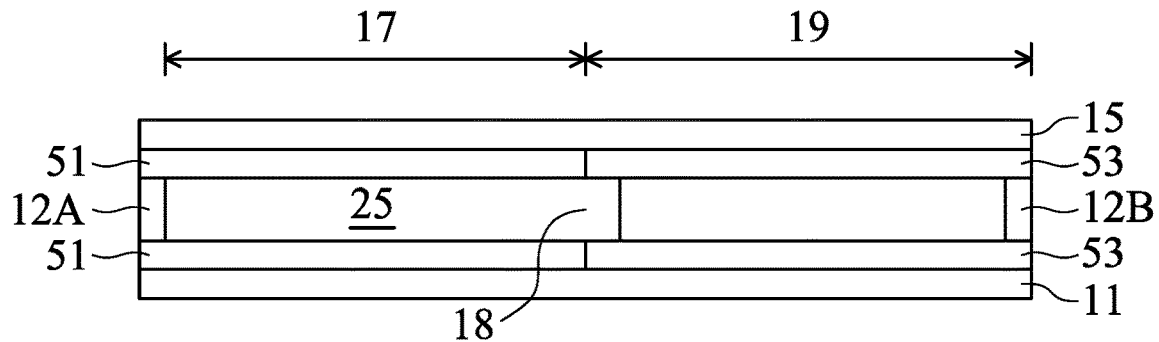
Figure 5C:
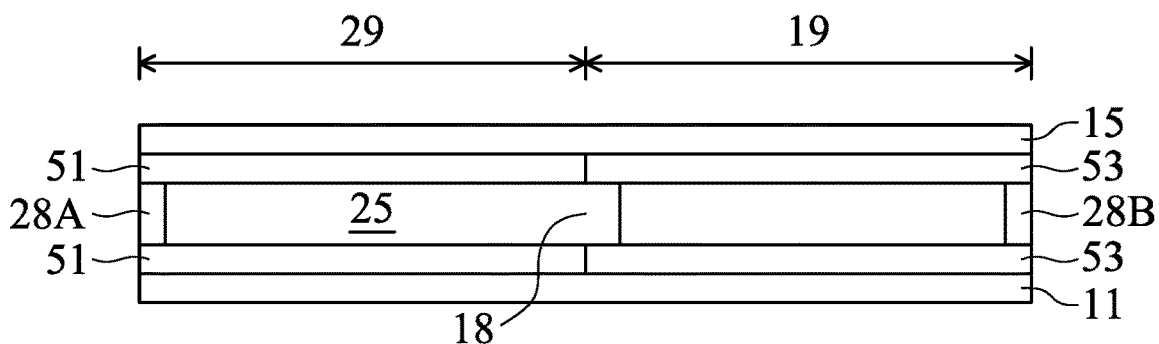

In some embodiments, the surfaces of the first substrate 11 and/or the second substrate 15 can be coated with a first boundary layer 51 made of a first material, in FIG. 5A, the first boundary layer 51 contacts the first substrate 11 or the first electrode 21 (or other layers not shown in FIG. 5A) disposed on the first substrate 11, and another first boundary layer 51 contacts the second substrate 15 or the second electrode 23 (or other layers not shown in FIG. 5A) disposed on the second substrate 15. Generally, the first boundary layer 51 coated on the substrate surfaces is polyimide for aligning the modulation material 25 in the active area 17 or the working element 29. However, the modulation material 25 in the buffer element 19 does not need to be aligned, meaning that the substrate surfaces in the buffer element 19 do not need to be coated with polyimide. On the other hand, a second boundary layer 53 made of a second material can be coated on the substrate surfaces in the buffer element 19, as shown in FIGS. 5B and 5C, it means the second boundary layer 53 contacts the first substrate 11 (or other layers disposed on the first substrate 11 not shown in FIG. 5A), and another second boundary layer 53 contacts the second substrate 15 or the second electrode 23 (or other layers not shown in FIGS. 5B and 5C) disposed on the second substrate 15. In some embodiments, the second boundary layer 53 can be fluorine-containing polymer such as polytetrafluoro ethylene, polyvinylidene fluoride, or the like. In some embodiments, an adhesive force between the modulation material 25 and the first boundary layer 51 is greater than an adhesive force between the modulation material 25 and the second boundary layer 53. As such, the modulation material 25 tends to stay in the active area 17 or the working element 29. On the other hand, the modulation material 25 in the buffer element 19 coated with the second boundary layer 53 (see FIGS. 5B and 5C) may move faster than the modulation material 25 in the working element 29 (or the active area 17) coated with the first boundary layer 51 (see FIG. 5A). It may help the modulation material 25 at a higher temperature rapidly enter the buffer element 19, and the modulation material 25 at a lower temperature rapidly return the active area 17 or the working element 29.

In another embodiment, the antenna device 200 further comprising a third spacer disposed in the working element 29 to maintaining the cell gap between the first substrate 11 and the second substrate 15 so that the modulation effect of modulation material 25 could normally work.

Figure 6:
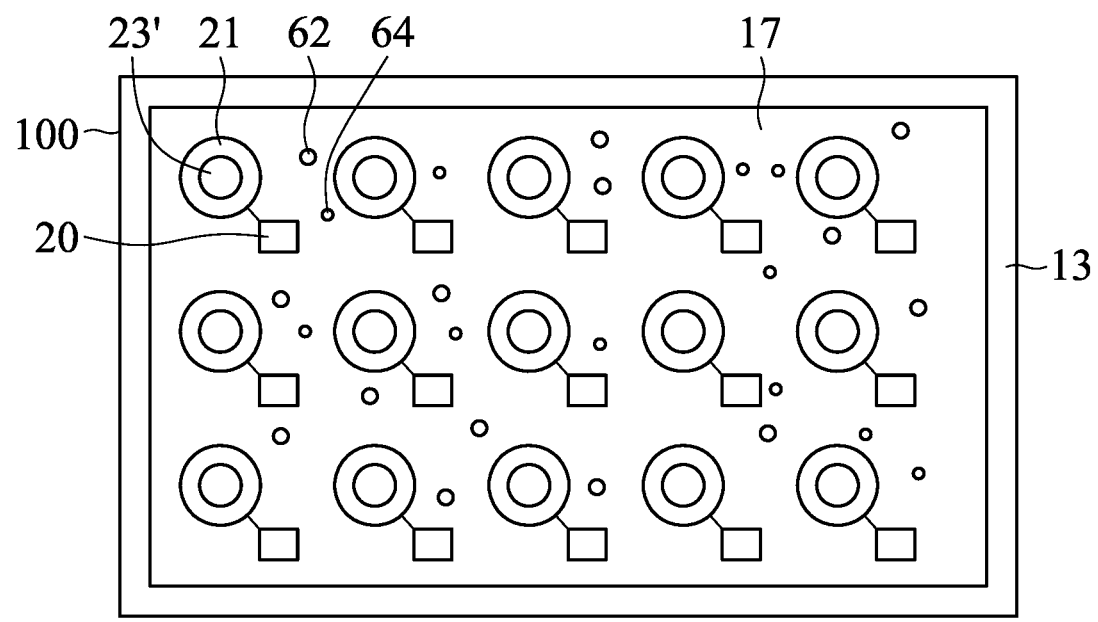
FIG. 6 show top-view of the working elements spacer in some embodiments of the disclosure.

Accordingly, the several embodiments of the disclosure utilize the buffer element connected to the active area or the working element to solve the problem of the increasing distance between the substrates due to the antenna device working in different temperature. In addition, the increased modulation material 25 returns to the active area or the working element after the cold contraction of the modulation material. When the modulation material flows between the active area (or the working element) and the buffer element by the opening, the active area (or the working element) filled with the modulation material maintains a uniform distance between the substrates. The modulation material returns to the working element at a lower temperature, which is beneficial to efforts to avoid the problem of reducing the distance between the substrates due to the decreasing amount of modulation material in the active area or the working element (if the modulation material at a higher temperature flows out the active area or the working element but does not return at a lower temperature). The several embodiments of the disclosure shown in FIG. 6 also utilize the first spacer 62 and second spacer 64 disposed out of the working elements to maintain the uniformity of cell gap in the working element and out of the working elements for solving the problem of the increasing distance between the substrates due to the antenna device working in different temperature. In some embodiment, the material of the first spacer 62 is different from the material of the second spacer 64. In some embodiment, the stiffness of the first spacer 62 is different from the stiffness of the second spacer 64. In some embodiment, the thickness of the first spacer 62 is different from the thickness of the second spacer 64. In addition, a third spacer (e.g. the spacer 27 corresponding to the working element 29) can be collocated with the above first spacer 62 and the second spacer 64.

Note that in some embodiments, some modulation material 25 filled in the buffer element 19, so that when antenna device working in low temperature, the modulation material 25 could flow into the active area 17 or working element 29, but in other embodiment, there may be no modulation material 25 in the buffer element 19, the buffer element 19 could have more accommodation space for adjusting increasing volume of the modulation material 25 when the antenna device working in high temperature.

Note that in some embodiments, the buffer element 19 not only provides a space for adjusting the amount of modulation material 25 when the antenna device working in different temperature, but also provides a space for the over-injection of the modulation material 25 in the manufacture process, it could keep uniform cell gap between the substrates, too.

While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An antenna device with an active area, comprising:
a first substrate;
a second substrate facing and spaced with the first substrate in a distance;
at least one working element disposed in the active area and disposed between the first substrate and the second substrate, wherein one of the at least one working element has a first electrode and a first partition element surrounding the first electrode and is filled with a modulation material;
at least one buffer element disposed in the active area and connected with the at least one working element, wherein one of the at least one buffer element has a second partition element to provide a space for adjusting the amount of the modulation material in the at least one working element; and
at least one first spacer disposed corresponding to the at least one buffer element.

2. The antenna device as claimed in claim 1, wherein the at least one working element comprises:
the at least one first electrode disposed on the first substrate; and
a second electrode disposed on the second substrate, wherein the second electrode includes at least one slit, and the at least one slit corresponds to the at least one first electrode.

3. The antenna device as claimed in claim 2, wherein a part of the at least one first electrode overlaps the second electrode.

4. The antenna device as claimed in claim 2, wherein, the first partition element is disposed between the first substrate and the second substrate.

5. The antenna device as claimed in claim 4, wherein the second partition element is connected to the first partition element.

6. The antenna device as claimed in claim 1, further comprising a seal disposed between the first substrate and the second substrate, and the seal encloses the at least one working element and the at least one buffer element.

7. The antenna device as claimed in claim 1, wherein in view of a normal direction of the first substrate, a ratio of an area of the at least one buffer element to an area of the at least one working element is greater than 0.01 and less than 0.5.

8. The antenna device as claimed in claim 1, wherein the at least one buffer element comprises a pipe portion which is spiral-shaped, linear-shaped, or zigzag-shaped.

9. The antenna device as claimed in claim 8, wherein the at least one buffer element further comprising a pool portion connected to an end of the pipe portion.

10. The antenna device as claimed in claim 1, further comprising:
at least one second spacer is disposed out of the at least one working element; and
at least one third spacer disposed out of the at least one working element, wherein the material of the second spacer is different from the material of the third spacer.

11. The antenna device as claimed in claim 10, wherein the stiffness of the second spacer is different from the stiffness of the third spacer.

12. The antenna device as claimed in claim 10, wherein the thickness of the second spacer is different from the thickness of the third spacer.

13. The antenna device as claimed in claim 10, further comprising a fourth spacer disposed corresponding to the working element.

* * * * *